Dec. 17, 1968   C. E. ANDERSON   3,416,566
VALVE OPERATING MECHANISM
Filed Nov. 7, 1966   3 Sheets-Sheet 1
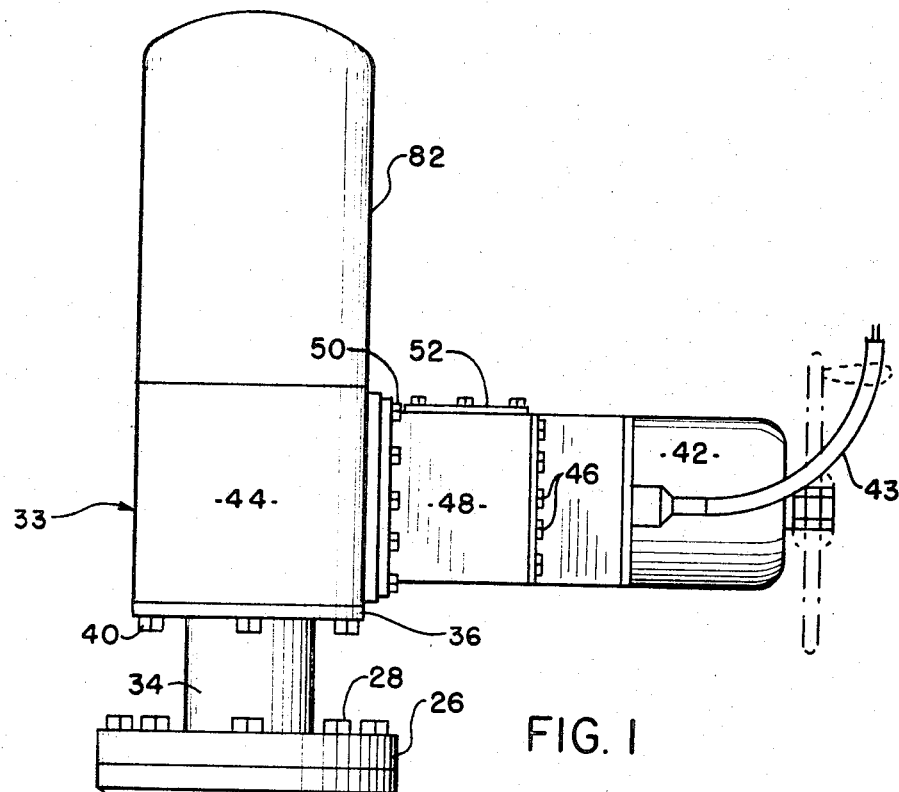
FIG. 1
INVENTOR.
CLIFFORD E. ANDERSON
BY
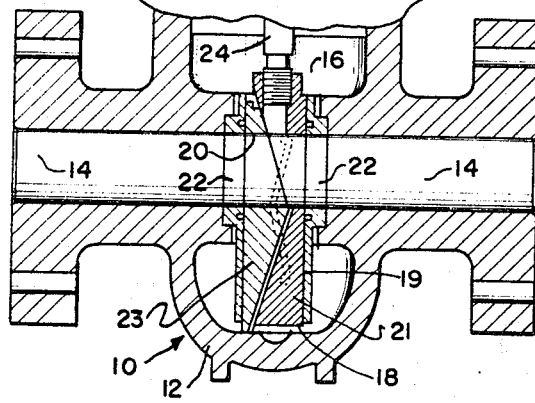
AGENT Dec. 17, 1968    C. E. ANDERSON    3,416,566
VALVE OPERATING MECHANISM
Filed Nov. 7, 1966    3 Sheets-Sheet 2

INVENTOR.
CLIFFORD E. ANDERSON
BY
*James F. Jackson*
AGENT

Dec. 17, 1968  C. E. ANDERSON  3,416,566
VALVE OPERATING MECHANISM
Filed Nov. 7, 1966  3 Sheets-Sheet 3

*INVENTOR.*
CLIFFORD E. ANDERSON
BY
*James Jackson*
AGENT

United States Patent Office 3,416,566
Patented Dec. 17, 1968

3,416,566
VALVE OPERATING MECHANISM
Clifford E. Anderson, Houston, Tex., assignor to ACF Industries, Incorporated, New York, N.Y., a corporation of New Jersey
Filed Nov. 7, 1966, Ser. No. 592,567
9 Claims. (Cl. 137—554)

ABSTRACT OF THE DISCLOSURE

A fail-safe valve operator mechanism which includes a rotatable drive shaft for imparting linear movement to the operating stem of the valve to which the operator mechanism is attached. The operator mechanism also includes a fail-safe mechanism including a retainer connected to the rotatable drive shaft and being movable linearly to a safe position by a spring member responsive to predetermined conditions. A latching mechanism is provided for the purpose of retaining the fail-safe mechanism in a position so that the spring member is retained under compression. Electrical circuitry and circuitry actuation structure is provided for transmitting to a remotely located control facility the exact position of the fail-safe mechanism.

---

This invention relates generally to devices for remotely controlling opening and closing movements of gate valves, and more particularly to mechanically controlled electrical circuitry for indicating the condition of the gate valve and valve controlling device at all times.

Electrically, hydraulically and mechanically controlled devices for controlling the operation of mechanical devices such as gate valves and which are referred to hereinafter as operators, electric operators or hydraulic operators, etc., have been frequently employed in the past in the petroleum industry as well as other industries involved in the control of flowing liquids and gases. For purposes of discussion, the operators will be discussed in their general application to valves and the petroleum industry, but it is not intended that the invention be limited thereto. The invention is quite adapted to the control of other mechanical devices and to the employment in various industrial applications not related to the petroleum industry. The discussion will also be limited generally to electrically energized operators for purposes of simplicity, but this is not intended to limit the spirit or scope of the invention. Upon an understanding of the invention, it will become apparent that the invention is equally applicable to various other types of operators.

Control of the electrically energized operators may be accomplished manually at the operator site, such as by manually depressing "open," "closed" or other operating sequence actuating switches of the operator as desired. It is generally only necessary to initiate an operating squence such as the "open" sequence or the "closed" sequence since operating sequences are generally automatically controlled. Such operating sequences are usually stopped by various types of limit switches which de-energize the electrical circuitry and stop the operator motor as the operator reaches a preslected position. The operating sequence of the valve operator may also be provided with electrical or electromechanical equipment for remote control, allowing the operator itself to be located remotely from a control facility therefor. Electrical control may be energized automatically, responsive to any number of conditions such as time sequence control, excessively high or low pressure conditions, for example. Electrically controlled valve operators may also be electronically controlled by radio signals and the like from control stations located many miles from the operator site. Such electronic control is generally only necessary for initiation of the electrical control circuitry of the operator to effect the desired operational sequence thereof.

While electrical operators have been developed for use in controlling the movement of both small and large gate valves involving virtually all possible ranges of pressure of the fluid controlled by the valve, the employment of a fail-safe operating system for automatic movement of the gate valve to a safe position responsive to undesirable or unsafe conditions of the valve or operator have heretofore not been available for controlling valves such as wellhead valves, pipeline valves or other mechanical devices of this nature. By the term "fail-safe," it is meant that the valve or other mechanical device controlled by the valve operator is automatically moved to a preselected "safe" position responsive to any number of undesirable conditions such as excessively high or excessively low pressure or failure of the power system controlling the operator, for example. Fail-safe valve operators are desirable, especially in their application to wellhead and pipeline systems, where extremely high fluid pressures may be encountered. It is frequently necessary to very quickly move a wellhead or pipeline valve controlling the flow of high pressure fluid to a preselected safe position to prevent damage to the wellhead or pipeline system. Time frequently is of the essence in alleviating the unsafe condition, thereby making it desirable to provide a valve operating mechanism, which in response to the unsafe condition will virtually instantaneously move the valve to the closed position.

The invention may be employed in controlling valves for wellhead and pipeline systems whether the systems are located on land or submerged under the sea. The invention is applicable to virtually all wellhead applications including undersea electrically controlled wellheads. The invention also has direct application to the chemical industry and other related industries, where it may be necessary to automatically shut down the flow of chemical processes in the event that dangerous conditions occur.

When electrically energized fail-safe valve operators are employed, there exists a necessity for positive information as to the condition of the power operator and valve mechanism at any time for the purpose of safety. Electrical signals may be employed to relate the operator position to a remotely located control facility. To assure that the electrical signal received at the control facility is a positive indication of the condition of the power operator and valve, it is desirable that the signal be mechanically initiated by the physical structure of the operator, rather than being related indirectly by operator structure such as geared limit switches, etc.

Accordingly, it is a primary object of this invention to provide a novel power operator mechanism having electrical signal producing elements which are actuated mechanically by the physical structure of the operator during operational movement of the operator mechanism to produce electrical signals positively indicating the position of the power operator mechanism.

It is a further object of this invention to provide a novel power operator mechanism having electrical signal producing elements which effectively indicate the position of the power operator mechanism at all times, whether during movement thereof or when in a stopped position at the end of an operational sequence.

It is an even further object of this invention to provide a novel power operator construction including structure for mechanically initiating and electrically transmitting an electrical signal which varies with the position of the mechanical operator structure.

It is among the objects of this invention to provide a novel power operator mechanism having electrical signal producing elements which are inexpensive in manufacture and reliable in use.

Briefly the invention comprises a fail-safe operator such as may be employed for the control of mechanical devices such as rising stem gate valves and the like, and which may include a suitable drive mechanism for moving the control stem of the mechanical device with which it is associated linearly between extreme positions, referred to hereinafter as "open" and "closed" positions. Various types of power mechanism such as hydraulic motor actuators or electrically energized actuators may be employed within the scope of this invention. For achieving fail-safe actuation of the mechanical device with which the operator is associated, a fail-safe compression spring of considerable magnitude is disposed to bear upon a movable retainer member, which may be indirectly connected to the operating stem of the mechanical device to be controlled. The fail-safe mechanism is adapted to move the retainer member and, through its connection to the operating stem, to move the operating stem of the mechanical device to a preselected "safe" position responsive to various predetermined conditions making such movement desirable. The power operator mechanism is provided with novel mechanical structure and electrical circuity, which cooperate to cause the relative position of the power operator mechanism to be related in the form of electrical signals to a remotely located control and monitoring facility. The invention effectively makes possible a visual indication of the operator position which may be monitored, allowing personnel at the control facility to observe power operator movement. Positive signals are given at both the "safe" and "set" positions of the power operator and these signals may be correlated with the visual movement signals to positively ascertain the position of the power operator at all times.

Other and further objects of the invention will become obvious upon an understanding of the illustrative embodiment about to be described or will be indicated in the appended claims, and various advantages not referred to herein will become apparent to one skilled in the art upon employment of the invention in practice.

Preferred embodiments of the invention which have been chosen for purpose of illustration and description are shown in the accompanying drawings forming a part of the specification wherein:

FIGURE 1 is an elevational view of a gate valve shown partially in section and provided with an electrically controlled fail-safe operator constructed in accordance with the scope and spirit of this invention.

Figure 2:
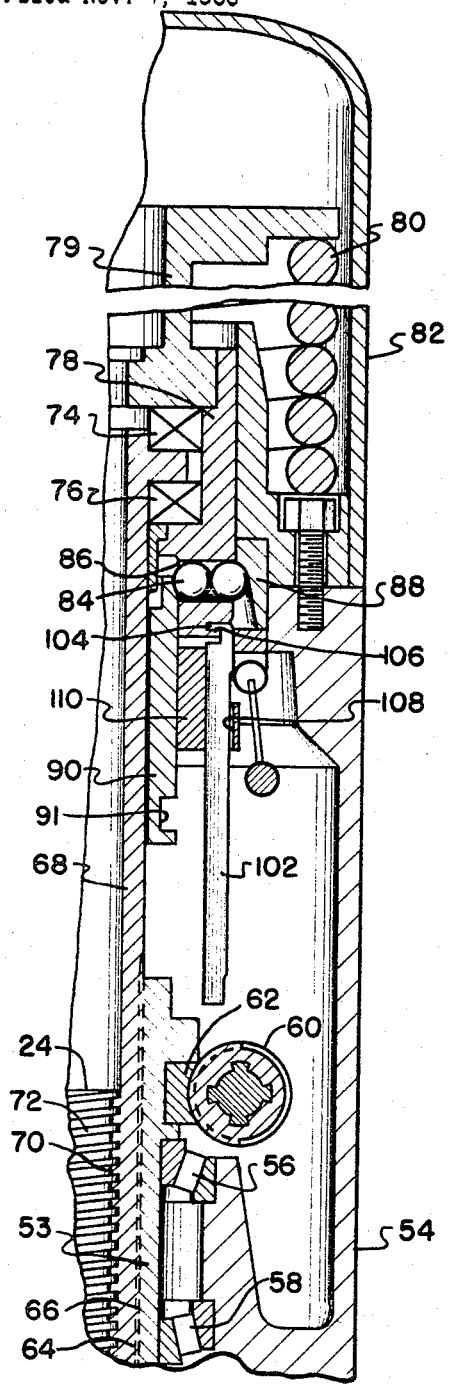
FIGURE 2 is a fragmentary sectional view of the invention of FIGURE 1 illustrating the structural components of the fail-safe operator disposed in the latched or "set" position thereof.

Referring now to the drawings for a better understanding of the invention, in FIGURE 1 is disclosed a valve 10 having a valve body 12 with aligned flow passages 14 formed therein for allowing the flow of fluid through the valve. Intersecting the flow passages 14 is a valve chamber 16, in which is positioned a reciprocating valve member 18. The valve member 18 has a passage 20 formed therein, which in the open position of the valve is aligned with the flow passages 14 forming a smooth conduit for the uninterrupted flow of fluid therethrough, and a solid portion 19, which is the closed position of the valve cooperates with a seat member to block the flow of fluid through the flow passages 14. The valve 18 is reciprocated for controlling the flow of fluid through the valve passages 14 by an operating stem 24, which is attached to one extremity of the valve member 18. The valve member 18, illustrated in FIGURE 1, is of a parallel expanding double wedge type and consists of a gate 21 and a segment 23 which cooperate for expanding the valve member 18 into tight sealing engagement with the seat members 22.

The particular valve construction shown in FIGURE 1 is intended merely for purpose of illustration and is not intended as limiting in regard to this invention. Various other types of valve and other mechanical devices which are controlled by reciprocating stems may be controlled by a power operator as described in detail hereinbelow.

A bonnet member 26 is fixed to the upper portion of the valve body 12 in any desired conventional manner to provide a sealed closure for the valve body 12 and includes a conventional packing assembly for the establishment of a fluid-tight seal between the valve stem and the bonnet. A yoke tube 34, fixed to or formed integral with the bonnet 26, is provided with a flange 36 at its upper extremity, which provides a support for an electrically energized power operator 33, fixed to the flange 36 by a series of bolts 40. An operator control assembly housing 48 may be fixed to the operator housing 44 by a series of bolts 50 as illustrated in FIGURE 1, or may be formed integral with the operator housing as desired. The control assembly housing is provided with an inspection plate 52, which is removable for assemblying and adjusting the control circuity of the operator. For imparting movement to the power operator, a motor 42, which might be an electrically energized motor, a pneumatic motor, hydraulic motor, etc., is connected to housing 48 by a series of bolts 46. Electrical power to operate and control the electrical devices and to transmit various electrical signals is supplied from a source of electrical energy at a remote control station through an electrical cable 43.

Figure 3:
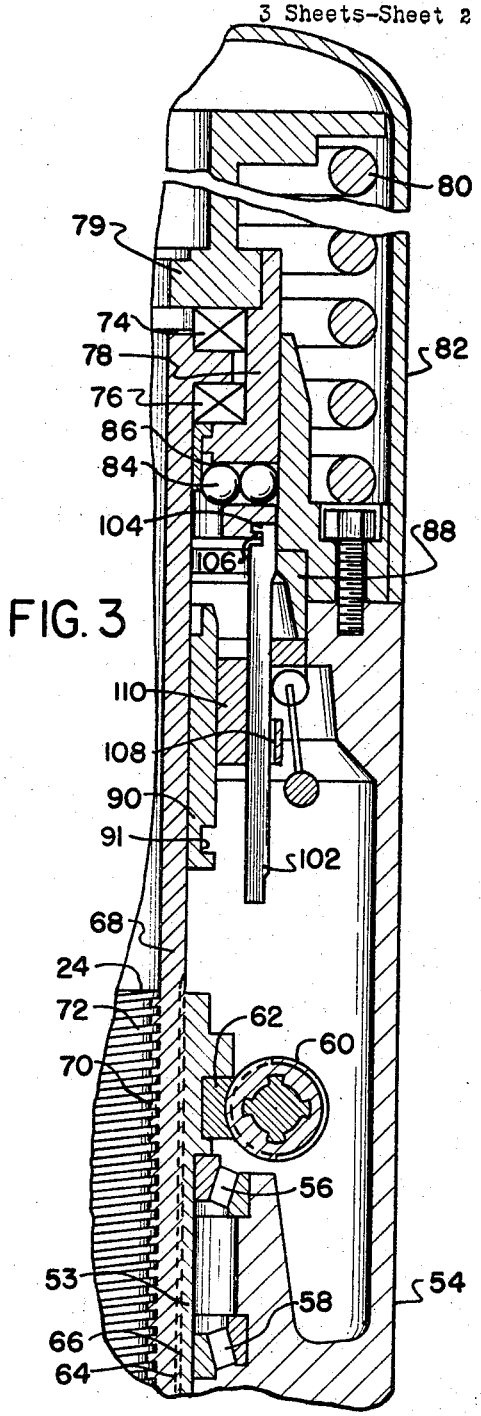
FIGURE 3 is a fragmentary sectional view of the invention of FIGURE 1 illustrating the fail-safe operator construction in the "safe" or "closed" position thereof.

With reference now particularly to FIGURES 2 and 3, the operator fail-safe mechanism includes a tubular drive sleeve 53 rotatably mounted within a housing 54 of the operator by upper and lower bearing members 56 and 58, respectively. The tubular drive sleeve 53 is driven by a worm 60, which imparts rotary movement to a worm gear 62 carried by the drive sleeve. The worm gear 60 is driven either directly or through suitable gear connections by the motor 42 of the operator. The drive sleeve 53 is provided with internal splines 64 which mate with external splines 66 formed on a tubular drive shaft 68. The splined connection between the drive sleeve 53 and the drive shaft 68 is substantially identical with the splined connection between members 66 and 82 as illustrated in FIGURES 2 and 3 of applicant's prior U.S. Patent No. 3,324,741. The drive shaft 68 is provided at its lower extremity with internal threads 70 which mate with the threads 72 of the valve stem 24. Rotational movement of the drive shaft 68, induced by the worm gear and spline connection with the drive sleeve 53, will cause vertical movement of the valve stem 24.

The drive shaft 68 is connected at its upper extremity by means of upper and lower bearings 74 and 76 to a generally tubular retainer member 78 which includes an extension 79 also serving as a thrust bearing retainer. A compression spring 80 is interposed between the upper extremity of the retainer extension 79 and an upper wall mitted visual indication that the fail-safe mechanism is in the "set" or latched position thereof. The position indication circuitry does not depend upon the operator circuitry for its control, but rather the circuitry is energized or deenergized by the physical position of the fail-safe mechanism, thereby giving a positive indication that the proper movement has taken place.

Figure 5:
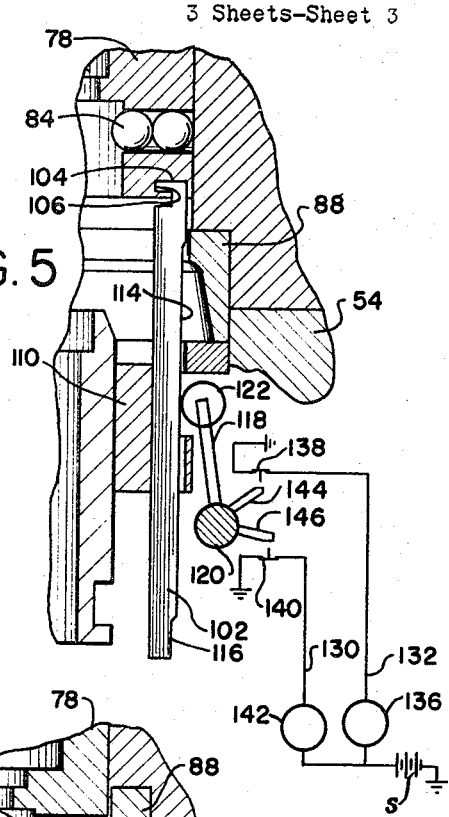
FIGURE 5 is a fragmentary sectional view of the invention of FIGURES 1 and 2, illustrating the operator position signal control structure as it appears during movement of the fail-safe mechanism between the "safe" and "set" positions thereof.

With reference now to FIGURE 5, the fail-safe mechanism of the operator is illustrated during movement thereof between the "safe" and "set" positions thereof. The keeper member 90 has been retracted to a position allowing the latching detents 84 to move inwardly, thereby releasing the restraining engagement between the outer latching detents and the tapered support shoulder of the latching insert 88. As the compression ring 80 forces the retainer member 78 in an upwardly direction, the roller 122 will be forced by the counterclockwise bias of the rotary shaft 120 to move into engagement with the middle step 114 of the cam 102. Under this condition the switch actuating arms 144 and 146 will both be positioned out of contact with their respective switches, thereby allowing both the "set" switch 138 and the "safe" switch 140 to be closed energizing both of the "safe" and "set" visual indicators 142 and 136. Under this condition, therefore, the personnel at the control facility will have a mechanically induced electrically transmitted visual indication that the fail-safe mechanism of the operator is moving at some position immediate its "safe" and "set" positions since both the visual indicators 142 and 136 are energized.

Figure 6:
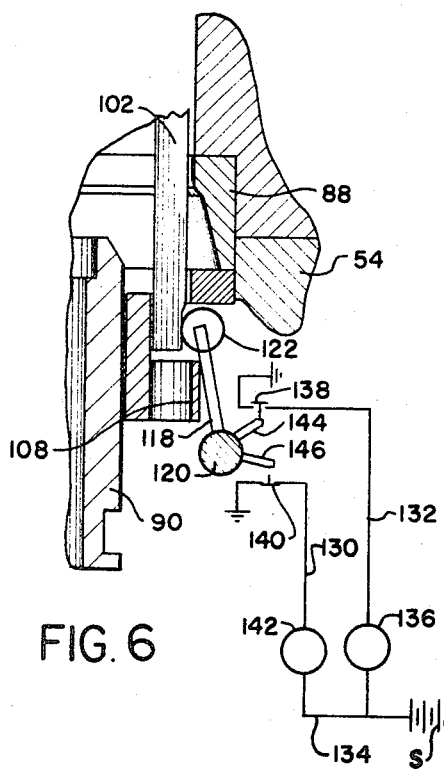
FIGURE 6 is a fragmentary sectional view of the invention of FIGURES 1 and 2, illustrating the operator position signal mechanisms at the "safe" position thereof.

With reference now to FIGURE 6, the operator mechanism is illustrated with fail-safe mechanism moved to its uppermost limit, thereby moving the cam 102 to a position allowing the roller 122 to be biased into engagement with the lower step 116 thereof. The shaft 120 is rotated by its counterclockwise bias under control of the arm 118 causing rotation of the switch actuating arms 144 and 146 to a position causing the switch actuating arm 144 to engage the actuating stem of the "set" switch 138, and thereby opening the switch and deenergizing the "set" circuit 132. The shaft 120 simultaneously rotates the switch actuating arm 146 away from the actuating stem of the "safe" switch 140, thereby allowing the normally closed "safe" switch to energize the safe circuit 142 and to thereby energize or actuate the visual or audible position indicator 142.

Figure 4:
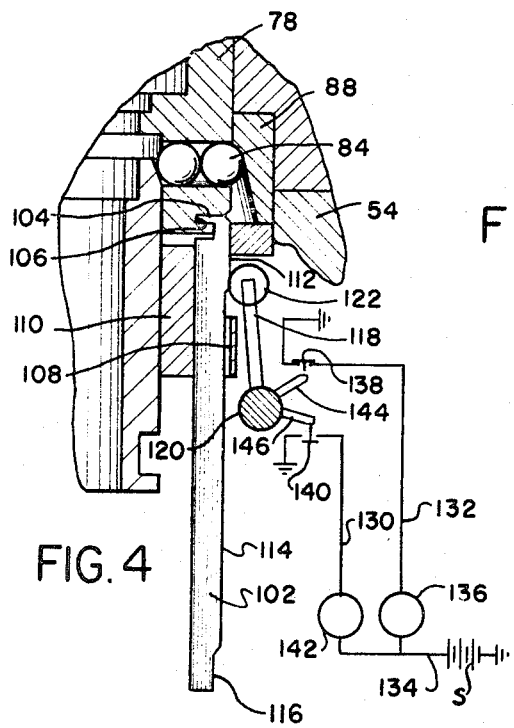
FIGURE 4 is a fragmentary sectional view of the invention of FIGURES 1 and 2 illustrating the operator position signal control structure as it is disposed in the latched position of the operator mechanism.

As the retainer member 78 is forced to its lowermost position compressing the fail-safe spring 80 as described above, the cam 102 will be moved from the FIGURE 6 position through the FIGURE 5 position and to the FIGURE 4 position thereof, thereby causing the roller 122 to force the rotary shaft 120 to rotate clockwise against the bias applied thereto. As the roller 122 moves from the lower step 116 of the cam 102 to the middle step 114 thereof, the switch actuating arm 144 will move away from the extension of the switch 138 allowing the "set" visual indicator to become energized. The switch actuating arm 146 will also be out of contact with the extension of the switch 140 allowing the "safe" circuit 130 also to be energized and energizing the "safe" visual indicator 142. Both of the visual indicators 136 and 142, under this condition, will be energized, thereby providing personnel at the control facility with a positive indication that the fail-safe mechanism is traversing between its "safe" and "set" positions. As the cam 102 is moved downwardly by the retainer 78 to a position causing the roller 122 to move to the upper step 112 thereof, the switch actuating arm 146 will open the "safe" switch 140, thereby deenergizing the "safe" circuit 130. The "set" switch 138 will remain energized and the "set" visual indicator 136 will positively indicate that the fail-safe mechanism of the operator has reached its latched position.

Figure 7:
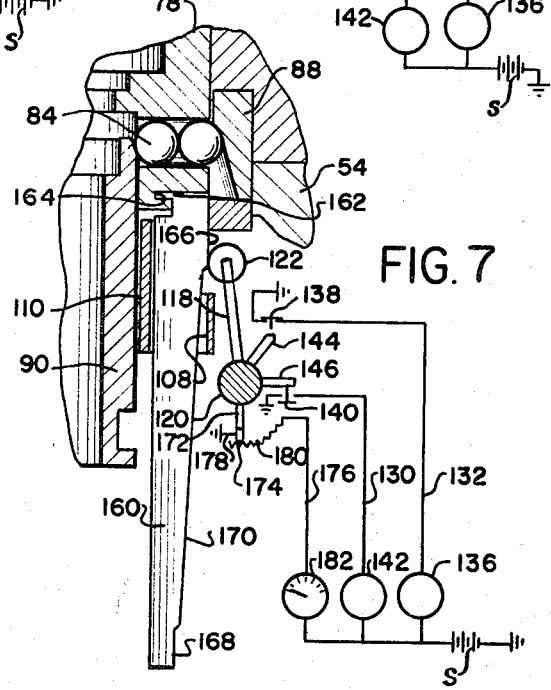
FIGURE 7 is a fragmentary sectional view of a power operator structure essentially as shown in FIGURES 2 and 3 illustrating a modified embodiment of the invention.

With reference to FIGURE 7, a modified embodiment of the invention is shown which enables personnel at the control facility to monitor the exact position of the fail-safe mechanism at all times. The modified embodiment also enables the personnel at the control facility to visually ascertain whether movement of the fail-safe mechanism is taking place and to visualize actual movement of the fail-safe mechanism. A cam member 160 is provided at its upper extremity with a cam support portion 162 received within an annular groove 164 formed in the lower extremity of the retainer member 78. The cam 160 is provided with an upper step 166 and a lower step 168 separated by a tapered cam portion 170. The rotary shaft 120 has fixed thereto a position indicating arm 118 and switch actuating arms 144 and 146 as discussed above in regard to FIGURES 4, 5 and 6. The switch arms 144 and 146 control energization of "set" and "safe" circuits 132 and 130 in the same manner and for the same purpose as discussed above.

The rotatable shaft 120 in accordance with the modified embodiment of this invention is provided with a position control arm 172 having a traverse member 174 fixed at the free extremity thereof and insulated from the shaft 120. A position indicating circuit 176 including a ground conductor 178 is connected through the traverse portion 174 of the control arm 172 to a resistance device 180 in the circuit 176. The resistance device may be rheostat or any one of various appropriate resistance devices. A position indicating meter 182 is connected into the circuit 176 and is responsive to the position of the traverse portion 174 of the arm 172 on the resistance device 180 to indicate in terms of resistance the relative position of the rotary shaft 120. As the cam 160 is moved upwardly or downwardly by the retainer 78 during "fail-safe" or "set" movements of the fail-safe mechanism, the roller 122 will follow the tapered cam surface 170, thereby causing the shaft 120 to move the arm 172 and the traverse portion 174 arcuately along the resistance member 180. The position indicating meter 182 is so calibrated that visual indication of the precise position of the fail-safe mechanism at any time during traverse thereof between the "latched" and "safe" positions will be displayed at the control facility by the meter 182. Any movement of the fail-safe mechanism either during "fail-safe" actuation or during the resetting operation may be visually monitored by means of the position indicating meter 182. Personnel at the control facility, therefore, by operation of the "set" and "safe" circuits 132 and 130 in the manner discussed above may be visually or audibly assured by the devices 136 and 140 that the fail-safe mechanism of the power operator is either at its "set" or "safe" position or is involved in movement between the "set" and "safe" positions. The personnel at the control facility by means of the position indicating meter 182 are given visual indication not only that the fail-safe structure may be disposed either at its "set" or "safe" positions, as a double-check measure, but also are assured visually of the specific position of the fail-safe structure, if the same is involved in traverse between the "set" and "safe" positions thereof. While movement of the fail-safe mechanism is taking place, therefore, this movement may be visually monitored at the control facility by means of the position indicating meter 182 which moves in direct correspondence to physical movement of the fail-safe mechanism. The control personnel, therefore, may easily be assured not only that movement of the fail-safe mechanism is taking place, but may visualize the direction of the movement. It is obvious, therefore, that at all positions of the fail-safe mechanism, the "set" and "safe" indicators 136 and 142 and the meter 182 provide a double check means of monitoring the fail-safe system of the operator.

Each of the electrical signals received at the control facility, either by means of the visual indicator means 136 and 142, or the position indicating meter 182, is induced mechanically by means of the roller 122 which follows relative movement of the cam member 102 or 160 as described above. The roller 122, through the position indicating arm 118, induces movement to the rotary shaft 120 which in turn induces movement to the various actuof the housing 54. A cover 82, which is fixed to the housing in any desired manner, provides a protective enclosure for the internal parts of the operator.

In the "latched" or "set" position of the fail-safe mechanism, the retainer spring 80 is compressed to the position illustrated in FIGURE 2, and the retainer 78 is maintained at its latched or FIGURE 2 position maintaining the drive shaft 68 at its FIGURE 2 position. Upon release of the retainer member 78, as will be discussed in detail hereinbelow, the compression spring 80 will drive the retainer member 78 to the safe position as shown in FIGURE 3. Through the thrust bearing connection between the retainer and drive shaft, the spring 80 will force the drive shaft 68 upwardly to the safe position thereof as illustrated in FIGURE 3. As the drive shaft 68 is moved vertically by the compression spring 80, the valve stem 24, through its threaded connection with the drive shaft, is also moved vertically, thereby moving the gate of the valve to its preselected safe position.

For maintaining the retainer member in the latched position thereof, a latching mechanism for controlling actuation of the fail-safe mechanism is provided which includes a plurality of ball detents 84 carried within lateral bores 86 formed in the retainer member 78.

In the "latched" or "set" position of the operator as illustrated in FIGURE 2, the outermost ones of the spherical latching detents 84 engage an internal angular shoulder of a latching insert 88 to lock the retainer member at the latched position thereof. An annular keeper member 90 is disposed partially internally of the retainer member 78 is the latched position of the retainer, and has a tapered cam surface thereof bearing against the innermost ones of the detents, thereby maintaining the outermost detents in engagement with the latching insert to restrain the retainer member 78 from moving upwardly under the bias of the compression spring 80. The keeper member 90 is retractable as illustrated in FIGURE 3 to a position allowing the detents 84 to move inwardly to a position out of engagement with the latching insert 88. For imparting movement to the keeper member 90, a keeper actuator of any desired type may be employed. For example, an arm member, not shown, may be received within an annular groove 91 formed in the keeper 90 to provide driving connection with the keeper. As the retainer member 78 is urged upwardly by the compression spring 80, the tapered internal surface of the latching insert 88 will cam the latching detents 84 inwardly allowing the retainer member 78 to be free for upward movement. The retainer member then will be urged upwardly by the compression spring 80 and, through the rotatable bearing connection between the retainer member and the drive shaft 68, will force the drive shaft and the valve stem 24 upwardly to the safe position thereof. The structural elements of the valve and valve operator including the fail-safe mechanism will be disposed in the FIGURE 3 position thereof subsequent to actuation of the fail mechanism in the manner described above.

To reset the fail-safe mechanism of the valve operator to its FIGURE 2 position, it is necessary to energize the power operator motor 42 which, through the operator drive mechanism, induces upward movement of the valve stem 24. The gate of the valve is raised by the rotating drive shaft until it engages a gate stop on the valve bonnet 26. The motor 42, however, will continue to operate, rotating the drive shaft 68 about the valve stem 24 and causing the threaded engagement between the drive shaft and stem to force the retainer member 78 downwardly against the bias of the compression spring 80. As the retainer member 78 moves to its lowermost position, the locking detents will move outwardly causing the outermost ones of the detents to engage the latching insert, thereby locking or latching the retainer member 78 in the FIGURE 2 or "set" position thereof. The motor 42 will be stopped automatically by limit switches or by torque switches as the retainer member becomes latched at the FIGURE 2 position thereof. The motor 42 will then be reversed, thereby reversing the direction of rotation of the drive shaft 68 about the valve stem 24 and driving the valve stem and the gate 21 downwardly to the lowermost or "open" position of the valve. The operator and fail-safe mechanism will then remain in the FIGURE 2 position thereof until such time as the fail-safe mechanism is actuated either automatically in response to the occurrence of a dangerous condition or selectively by the personnel at the control facility. The valve may be opened or closed with the fail-safe mechanism remaining in the FIGURE 2 position merely by selective operation of the operator motor 24.

To monitor the position of the fail-safe mechanism of the valve operator, referring particularly to FIGURE 4, a cam 102 is provided with a projecting portion 104 at the upper extremity thereof which is fitted within an annular groove 106 formed in the retainer member 78. The cam 102 extends through a guide aperture 108 formed in a keeper guide member 110. The cam 102 has three steps 112, 114 and 116 formed thereon. A position indicating arm 118, which is fixed to a rotary shaft 120, journaled for rotation within the operator housing, is provided with a cam following roller 122 at the free extremity thereof. The shaft 120 is spring biased in a counterclockwise direction, as viewed in the figures, forcing the roller 122 into engagement with the cam 102. As the cam 102 is moved upwardly by the retainer 78 subsequent to release of the latching detents by the keeper member, the position indicating arm 118 will be rotated counterclockwise by the bias as the roller 122 is maintained in engagement with the adjacent one of the steps 112, 114 and 116 of the cam 102. This movement imparts counterclockwise rotation to the shaft 120 since the arm 118 is fixed thereto.

For indicating the position of the operator fail-safe mechanism, electrical circuitry is provided which includes a "safe" signal circuit 130 and a "set" signal circuit 132 as illustrated in FIGURES 4, 5, and 6 The "safe" and "set" circuits are both connected through an electrical conductor 134 to a source S of electrical energy. The set circuit 132 includes a "set" visual indicator 136, which may be an incandescent signal light or a means of audible signal, as desired. A normally closed switch 138 is disposed within the circuit 132 and serves, when closed, to energize the signal indicator means 136, thereby giving an indication at the control facility that the fail-safe mechanism is in its lowermost latch or "set" position. The "safe" circuit 130 is also connected to the conductor 134 and includes a normally closed switch 140 for controlling energization of an audible or visual signal indicator 142 in the circuit. With the switch 140 closed, the "safe" visual or audible signal indicates that the fail-safe mechanism has reached a position fully moving the valve mechanism to its safe position.

The shaft 120 will be positioned at either of three positions as determined by FIGURES 4, 5, and 6 which illustrate the fail-safe mechanism of the valve operator in its various stages of movement between the "set" and "safe" positions. The shaft 120 is provided with a pair of switch actuating arms 144 and 146 which are disposed for contact, respectively, with actuating stems of the switches 138 and 140.

With the valve operator fail-safe mechanism in the latched position thereof as illustrated in FIGURE 4, the cam 102 will be disposed at its lowermost position and the roller 122 will rest on the top step 112 thereof. In this position the shaft 120 will be rotated to its maximum clockwise position, causing the switch actuating arm 146 to open the switch 140 in the safe circuit 130, thereby deenergizing the "safe" visual indicator 142. The switch actuating arm 144 will be rotated clockwise away from the actuation stem of the switch 138 allowing the switch to be closed and thereby energizing the circuit 132 and the "set" visual indicator 136. In the "set" or lowermost position of the fail-safe mechanism, therefore, the "set" visual indicator will be energized giving the operator at the control facility a mechanically induced electrically transating arms 144, 146 and 172. These arms relate the mechanical position of the fail-safe mechanism through electrical circuity to electrically energize the visual or audible position indicating means at the control facility.

It is evident, therefore, that I have provided a fail-safe power operator mechanism having structure for providing a mechanically induced electrically transmitted signal which may be visually or audibly monitored at a remotely located control facility for positively assuring the position of the fail-safe mechanism of the power operator during all phases of movement thereof. Through use of the invention, the exact position of the fail-safe mechanism of the power operator is visually shown on the control panel at the remote control facility whether the fail-safe mechanism is moving or stopped at any position thereof. The invention is extremely simple in nature as well as being accurate and reliable in use. The invention, therefore, is one well adapted to attain all of the objects hereinabove set forth together with other advantages which are obvious and inherent from a description of the apparatus itself.

It will be understood that certain features and subcombinations are of utility and may be employed without reference to other features and subcombinations. This is contemplated by and is within the scope of the appended claims.

As many possible embodiments may be made of the invention without departing from the spirit or scope thereof, it is to be understood that all matters herein set forth and shown in the accompanying drawings are to be interpreted as illustrative and not in a limiting sense.

I claim:

1. A fail-safe valve operator comprising an operator housing, a drive shaft within said housing and threadedly receiving the threaded operating stem of a rising stem valve, means for imparting rotary movement to said drive shaft for imparting vertical movement to said operating stem to open or close the valve, a fail-safe mechanism including a retainer member connected to said drive shaft and being vertical movable between set and safe positions thereof and thereby imparting vertical movement to said drive shaft and said stem, means biasing said retainer member toward the safe position thereof, electrically controlled latching means releasably restraining said retainer member in the set position thereof, said latching means releasing said retainer member either selectively or automatically responsive to predetermined conditions of said valve or operator, said operator having means for mechanically effecting electrical signals in response to the various positions of said fail-safe mechanism, said valve operator having electrical circuitry receiving said electrical signals and transmitting said electrical signals to a remotely located control facility and displaying said signals whereby personnel at said control facility may ascertain the position of said fail-safe mechanism at all times.

2. A fail-safe valve operator as set forth in claim 1, said means for mechanically effecting various electrical signals including a variable resistance circuit and means for displaying the various resistances of said variable resistance circuit at said control facility, a resistance actuating arm on said rotatable shaft translating rotary motion of said shaft into variance of said variable resistance circuit, whereby the exact position of said fail-safe mechanism at any particular time is translated in the form of a resistance and displayed at said control facility and movement of said fail-safe mechanism is visually displayed at said control facility.

3. A fail-safe valve operator as set forth in claim 1, said means for mechanically effecting electrical signals comprising a cam member carried by said retainer member, electrical position indicating circuitry connecting said operator with a remotely located control facility, said circuitry having a source of electrical energy and including means for displaying said electrical signals at said control facility and means for energizing said position indication circuitry, circuit actuating means in engagement with said cam, said circuit actuating means being responsive to the position of said cam to energize said position indicating circuitry, whereby the position of said fail-safe mechanism is displayed in terms of electrical signals at said control facility.

4. A fail-safe valve operator as set forth in claim 3, said cam member having a plurality of steps thereon, said circuit actuating means comprising a rotatable shaft having actuating arms thereon, a position indicating arm fixed to said shaft and having means thereon engaging said cam member, said shaft being rotatably biased maintaining said cam engaging means in engagement with said cam, whereby the position of said fail-safe mechanism is translated into rotation of said shaft.

5. A fail-safe mechanism for controlling linear movement of the operating stem of a mechanical device, said fail-safe mechanism comprising a drive shaft connected to said operating stem, a retainer member connected to said drive shaft and being movable linearly between set and safe positions, means biasing said retainer member in a direction away from said operating stem, means adapted to releasably latch said retainer member at the set position thereof and to release said retainer member responsive to the occurrence of a preselected condition, thereby allowing said biasing means to move the retainer drive shaft and stem to a predetermined safe position, electrical position display circuitry connecting said fail-safe mechanism with a control and monitoring facility, said circuitry including electrical switches at said fail-safe mechanism adapted when actuated to energize said display circuitry, said circuitry having display means at said control facility, a cam member adjacent said fail-safe mechanism and being linearly movable in relation to linear movement of said fail-safe mechanism, switch actuating means disposed adjacent said fail-safe mechanism and including means engaging said cam member and translating said cam position to a relative position of said switch actuating means, whereby said switches are actuated responsive to particular positions of said fail-safe mechanism energizing said display means to remotely indicate the position of said fail-safe mechanism.

6. A fail-safe mechanism as set forth in claim 5, a movable position indicating member disposed adjacent said fail-safe mechanism and having means thereon biased in engagement with said cam member, said position indicating member being movable in relation to said fail-safe mechanism under control of said cam member, said electrical position display circuitry including a variable resistance and means for displaying the various resistances of said circuit at said control facility, said position indicating member controlling the resistance of said variable resistance circuit, whereby the position of said fail-safe mechanism is transmitted from said fail-safe mechanism to said control facility in the form of a variable electrical signal which is displayed at said control facility.

7. A fail-safe mechanism as set forth in claim 5, said switch actuating means comprising a rotatable shaft having a plurality of switch actuating arms thereon, a cam engagement arm fixed to said rotatable shaft and engaging said cam member, means biasing said cam engagement arm toward said cam, said cam engagement arm being movable by said cam to translate movement of said fail-safe mechanism into relative rotation of said rotatable shaft, said switch actuating arm adapted to actuate said switch means at various relative positions of said rotatable shaft.

8. A fail-safe mechanism as set forth in claim 7, said electrical position display circuitry including a variable resistance circuit and means for displaying the resistance of said variable resistance circuit, a resistance actuating arm on said position indicating member, said resistance actuating arm controlling said resistance circuit whereby the exact position of said fail-safe mechanism is translated to said control facility in the form of a variable electrical signal and displayed for purposes of monitoring.

9. A fail-safe mechanism as set forth in claim 8, said cam member having a flat step at each extremity thereof and a tapered portion intermediate said flat steps, said position indicating means actuating said switch means when said cam engaging means is in engagement with the flat steps of said cam, said variable resistance circuit being variably energized as the tapered portion of said cam is moved relative to said switch actuating means, whereby movement of said fail-safe mechanism will be displayed for the purpose of monitoring.

References Cited

UNITED STATES PATENTS

| | | | |
|---|---|---|---|
| 1,644,171 | 10/1927 | Caldwell | 137—554 |
| 2,860,266 | 11/1958 | Schrader | 251—133 XR |
| 2,878,687 | 3/1959 | Kron et al. | 251—134 XR |
| 3,033,512 | 5/1962 | Lieser | 251—74 XR |
| 3,324,741 | 6/1967 | Anderson | 74—625 |

HENRY T. KLINKSIEK, *Primary Examiner.*

U.S. Cl. X.R.

74—625; 251—67